June 10, 1969 J. J. CHESNUL ETAL 3,449,738
ELECTRONIC SECURITY SYSTEM
Filed June 15, 1966
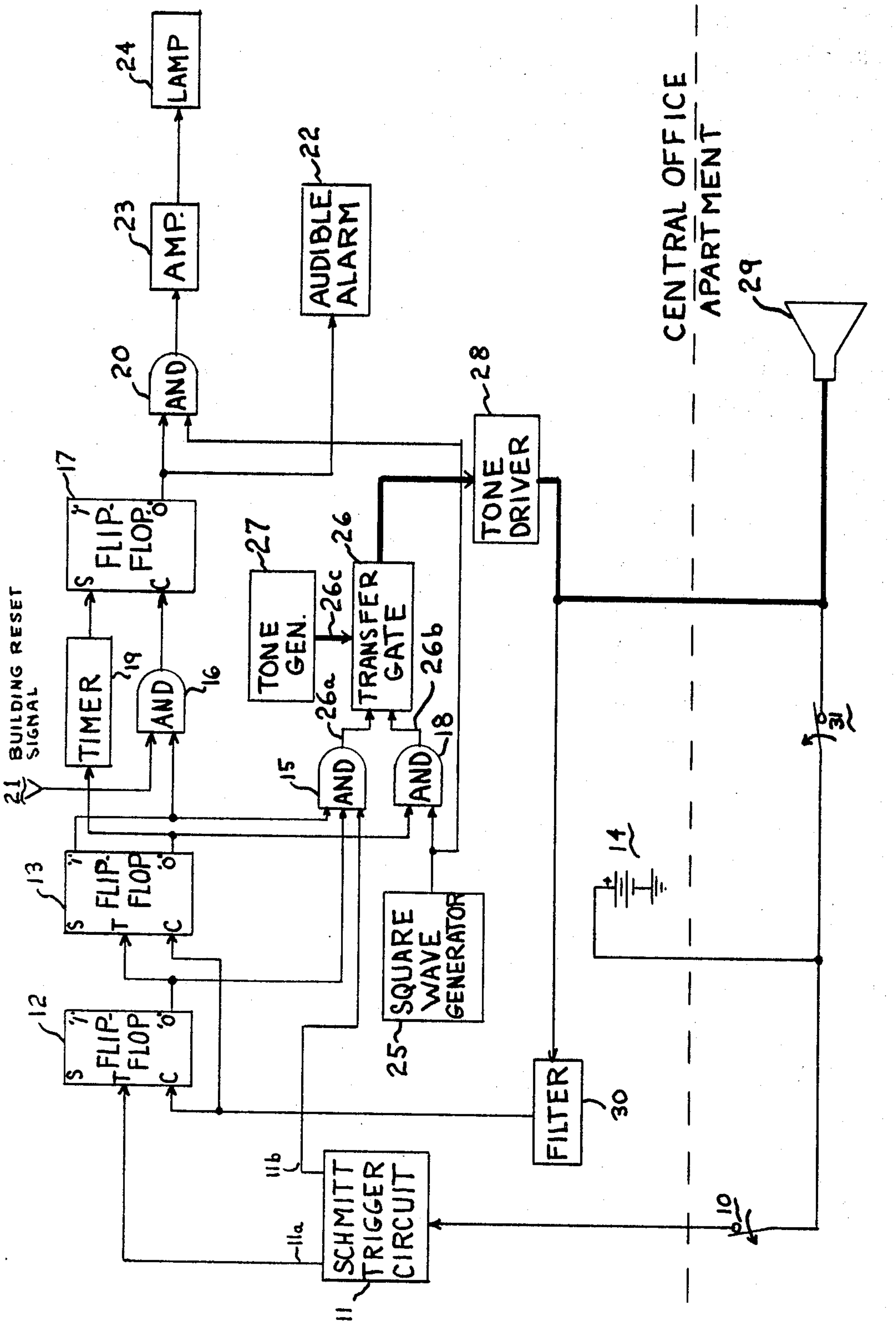

3,449,738

ELECTRONIC SECURITY SYSTEM

Jerome J. Chesnul, Chicago, and Ronald A. Waxman, Highland Park, Ill., assignors to Jeron Electronics, Inc.

Filed June 15, 1966, Ser. No. 557,841
Int. Cl. G08b 13/08
U.S. Cl. 340—274 4 Claims This invention relates to electronic security systems, and in particular to security systems actuated by a tenant wishing to secure unauthorized openings of entrances to an apartment or other premises.

Existing security systems have the disadvantage that installation and maintenance are difficult due to the use of cumbersome electric tubes and relays. This requires point to point wiring for installation and considerable storage space for the central portion of the system when such a system is designed both to monitor a plurality of remote premises and to identify which individual premises has been subject to an unauthorized entry. Further, these systems make no provisions for having the tenant, prior to activation of the system, initiate a test of the electronic circuitry without notifying the central office of such test.

A feature of the present invention is to provide a security system using modern digital, solid-state circuitry which is easily put into individual modules thereby facilitating installation, maintenance, and expansion of the system.

Another object of the present invention is to provide for an electronic security system in which a tenant desirous of activating a security system can initiate a test of the electronic circuitry associated therewith and hence be assured of its operability.

Still another object of the present invention is to provide a self-checking feature in a security system wherein the central office is not notified of the test.

An even further object of the present invention is to provide an electronic security system wherein once the system has been activated, the deactivation means is inaccessible to a person not in the premises sought to be secured.

An even further object of the present invention is to provide for an electronic security system wherein a single tone generator is used to signal all the remote secured premises.

Other objects of the present invention are to provide for an electronic security system capable of being combined with the building interphone system, and one which may be used to secure the premises whether the tenant is present or absent.

Additional objects will become apparent from the following detailed description accompanied by the attached drawing which is a block schematic diagram of a preferred embodiment of the invention.

It is to be noted that in the following description, all of the various circuits in the preferred embodiment are of conventional construction commonly known to persons skilled in the art and that there are many equivalent forms and modifications thereof all of which may be used to practice the principle of the invention. Therefore, the scope of our invention is not to be limited to the forms disclosed but is to be determined only by the appended claims. For instance, a bistable circuit or flip-flop, as it is commonly called, has a SET input, a CLEAR input and a TRIGGER input, and "1" and "0" outputs. When a voltage level is present at the CLEAR input, a corresponding voltage will appear at the "1" output and the circuit is said to be in its "clear" state. It will remain in the clear state even though the input may be removed until a voltage is present at the SET input (in which case the circuit is in its "set" state) or a negative-going pulse is presented to the TRIGGER input, in which latter case the outputs will change states irrespective of what states they may previously have been in. It will further be assumed that a logical one is represented by a relatively positive voltage.

Referring then to the drawing, one terminal of a door switch 10 is connected to the input of a Schmitt trigger circuit 11. Schmitt trigger circuit 11 is a bistable pulse generator in which an output pulse of constant amplitude exists at output 11*a* only as long as the input voltage exceeds a certain value. It is of conventional construction and is used herein principally to eliminate the contact bounce of door switch 10. The other terminal of door switch 10 is connected to a battery 14 in the central office. Output 11*b* of Schmitt trigger circuit 11 carries the binary complement of output 11*a*. Output 11*a* of Schmitt trigger circuit 11 is connected to the TRIGGER input (T) of a flip-flop 12. The "0" output of flip-flop 12 feeds the TRIGGER input of a flip-flop 13; it also feeds one input of an AND gate 15.

The "1" output of flip-flop 13 is connected to an input of AND gate 15 and to one input of an AND gate 16. The output of AND gate 16 feeds the CLEAR input of a flip-flop 17. A building reset signal 21 feeds the other input of AND gate 16.

The "0" output of flip-flop 13 feeds an input of AND gate 18 and a timer circuit 19 in parallel. Timer circuit 19 is constructed such that a voltage level will appear at its output a predetermined time after a voltage level is presented to its input. If the input voltage is removed at any time prior to existance of an output voltage, no output will appear. The output of timer circuit 19 is connected to the SET input of flip-flop 17. The "0" output of flip-flop 17 is connected to an input of an AND gate 20 and also to the input of an audible alarm 22 located at the central office.

The output of AND gate 20 feeds an amplifier 23 which in turn energizes a lamp 24, also located in the central office. A square wave generator 25 is connected to the other input of AND gate 20 and to an input of AND gate 18.

The outputs of AND gate 15 and AND gate 18 feed a transfer gate 26. Transfer gate 26 is constructed such that a voltage level present at either input 26*a* or 26*b* will enable the signal on input 26*c* to be transferred to the output. A tone generator 27 is connected to input 26*c* of transfer gate 26.

Transfer gate 26 feeds a tone driver 28. The tone driver 28 is a conventional amplifier adapted to drive the various cables extending from the central office to the individual apartments. It is connected to the input of a speaker 29 located on the premises sought to be secured. A filter 30 is connected between the output of tone driver 28 and the CLEAR input of flip-flop 12. A key-actuated switch 31 is connected between battery 14 and the common connection of filter 30 and the output of tone generator 28. The heavy signal lines of the drawing indicate the path of the tone signal.

The operation of the system will now be described in detail. The key-actuated switch 31 is normally closed; and therefore, battery 14 is connected through filter 30 to the CLEAR inputs of flip-flops 12 and 13 thereby holding them in the clear state and disabling AND gates 15 and 18. When a tenant wishes to secure the premises, he first turns the key-actuated switch 31 thereby interrupting power from battery 14 and leaving the CLEAR inputs of flip-flops 12 and 13 floating, but not changing the states of the flip-flops 12 and 13.

The tenant then opens the door for the first time to initiate a check of the system. This opens the door switch 10 removing the input from Schmitt trigger circuit 11 and enabling output 11*b* to go positive whereby a logical one appears at an input of AND gate 15. At the same time, output 11*a* of Schmitt trigger circuit 11 goes negative and switches the output state of flip-flop 12 so that a relatively positive voltage appears at its "0" output whereby a logical one appears at a second input of AND gate 15. AND gate 15 is thereby enabled since the state of flip-flop 13 has not changed and a logical one appears at its "1" output. The output of AND gate 15 thereupon energizes input 26*a* to enable transfer gate 26 to continuously transmit the tone signal from tone generator 27 to tone driver 28 which drives the cable back to the speaker 29 located in the apartment. Filter 30, which allows the passage of direct current only prevents the tone from energizing the CLEAR inputs of flip-flops 12 and 13.

It will be noted at this time that upon initiating the test condition, the tenant has verified the operability of the following components of the system: Schmitt trigger circuit 11, flip-flop 12, flip-flop 13, AND gate 15, transfer gate 26, tone driver 28, tone generator 27, filter 30, and speaker 29, door switch 10, battery 14 and wire to apartment as well as their associated wires and connections. The illustrated embodiment makes a provision, as explained above, for a continuous tone to be sent to the secured premises for purposes of notifying the tenant that the system is undergoing a check. This is to be distinguished from the intermittent tone described below which is indicative of the opening of an entrance to the secured premises. The tenant will then silence the continuous tone, indicative of a successful test, and set the system in a condition of surveillance by closing door switch 10 so that output 11*b* of Schmitt trigger circuit 11 goes negative to disable AND gate 15.

The second opening of door switch 10 after the key-actuated switch 31 has been opened, i.e. when the system is in a condition of surveillance, switches flip-flop 12 back into its clear condition thereby disabling AND gate 15 and at the same time switching the state of flip-flop 13 to its set state by applying a negative-going voltage to its TRIGGER input. Since this second opening of door switch 10 is an entrance either by an unauthorized person or the tenant, a different tone from the continuous checking tone is sent to the room at this time. Namely, the "0" output of flip-flop 13 enables AND gate 18 through which is transmitted a signal of 4 cycles per second from square wave generator 25. The output of AND gate 18 thereupon energizes lead 26*b* of transfer gate 26 for alternate periods of an eighth of a second, during which periods the output of tone generator 27 is fed to tone driver 28 through transfer gate 26. Hence, a tone having the same frequency of the test tone, but appearing intermittenly, energizes speaker 29.

The "0" output of flip-flop 13 at the same time energizes timer circuit 19 which, after a predetermined time, will energize the SET input of flip-flop 17. This predetermined time delay gives the tenant a chance to deactivate the system by closing key-actuated switch 31 and thereby clear flip-flops 12 and 13, and eliminate the intermittent tone on the speaker 29. At the same time, timer circuit 19 will be de-energized without having set flip-flop 17. If the second opening of door switch 10 had been as unauthorized opening, timer 19 upon expiration of the predetermined time would set flip-flop 17. The "0" output of flip-flop 17 would enable an input of AND gate 20. Since the other input of AND gate 20 is received from the output of square wave generator 25, its output would then intermittently energize amplifier 23 to light lamp 24 at the central office identifying which apartment has been illegitimately entered. At the same time, flip-flop 17 would trigger an audible alarm 22 located at the central office. This indicates to the operator at the central office that an investigation must be made.

It will be noted that the system is uniquely adapted to prevent collusion by a central office operator with an unauthorized person since the operator is not notified when a tenant tests the system before he leaves the premises, and secondly, the operator can not disable a central office alarm once it is energized except with the cooperation of the tenant. This is accomplished by having the operator push a button to send a building reset signal 21 to enable one input of AND gate 16. The other input of AND gate 16 is enabled only when the key-actuated switch 31 is again closed to clear flip-flop 13. The combination of these two events is the only situation in which the central office lamp 24 and audible alarm 22, once energized, can be deactivated. Further, it will be noted that once the central office alarms have been energized, an unauthorized person in the apartment cannot turn them off.

Provision may be made, as our preferred embodiment shows, for independent testing by the central office operator of the lamp 24 and the audible alarm 22. The lamp 24 identifies which apartment has been subjected to an unauthorized entering, and there must be a lamp for each apartment under surveillance.

The following additional advantages will, therefore, be noted from the above description. The logic circuitry for each apartment may be put on a single printed circuit card so that upon failure of a test initiated by the tenant, he will call the central office on the telephone and the central office operator will replace the suspect printed circuit card. The system may then be retested immediately and the defective card returned to the manufacture for repair. The tenant is assured of continuous operability with minimal delay. Further, only three lines are required to extend from the central office to the apartment: one to the door switch, one to the junction of the key-actuated switch and the speaker and the third to the battery connection which is common to all apartments.

The embodiments of the invention in which an exclusive property or privilege is claimed are defined as follows:

1. A security system for detecting the unauthorized opening of an entrance to apartments and for alerting a central office thereto, comprising:

signalling means adapted to transmit a first and a second distinguishable signal in each of said apartments;

first and second binary storage means, each having a clear and a set state, for each apartment;

means, including a key-actuated switch in each apartment having a first and a second position, for holding said first and second binary storage means in a clear state when said switch is in said first position;

means associated with the entrance to each apartment for generating a signal in response to said entrance being opened;

means responsive to said entrance signal for setting said first storage means responsive to the first opening of said entrance after said switch is set to its second position thereby energizing said apartment signalling means to transmit said first signal indicative of an operable condition of said system;

means responsive to said entrance signal and said first storage means for changing the state of said second storage means the second time said entrance signal is generated after said switch is placed in its second position and for energizing said apartment signalling means to transmit said second signal;

timer means responsive to the output signal of said second storage means for generating a signal a predetermined time after the state of said second storage means has been changed; and alarm means in said central office receiving the output signal of said timer means for signalling an alarm in response to said timer output signal, said alarm signal being indicative of an unauthorized entrance to an apartment, said timer being inactivated prior to generating an output signal if said switch is set to its first position thereby causing said second storage means to assume a clear state.

2. The apparatus of claim 1 wherein said apartment signalling means comprises:

a tone generator in said central office;

a speaker in each of said apartments;

means for continuously gating the output signal of said tone generator to the speaker in an apartment whose entrance has been opened to define said first distinguishable signal; and means for intermittently gating the output signal of said tone generator to the speaker in an apartment whose entrance has been opened to define said second distinguishable signal.

3. The apparatus of claim 1 further including:

means operable from said central office for generating a reset signal; and coincidence means responsive only to said reset signal and the set state of said second storage means for inactivating said central office alarm means.

4. The apparatus of claim 1 wherein said central office alarm means comprises:

an audible alarm; and a visual indicator for identifying the apartment subjected to an unauthorized entry.

References Cited

UNITED STATES PATENTS

| | | | |
|---|---|---|---|
| 2,971,186 | 2/1961 | Ripepi | 340—276 |
| 3,128,456 | 4/1964 | Silliman et al. | |
| 3,200,393 | 8/1965 | Worley | 340—276 |
| 3,286,250 | 11/1966 | Teitelbaum | 340—276 |

JOHN W. CALDWELL, *Primary Examiner.*

D. L. TRAFTON, *Assistant Examiner.*

U.S. Cl. X.R.

340—276